US005891562A

United States Patent [19]

Rutz et al.

[11] Patent Number: 5,891,562

[45] Date of Patent: Apr. 6, 1999

[54] MULTI-LAYER, FLEXIBLE TRANSFER TAPE COMPRISING POLYMERIC HOLLOW PARTICLES A PROCESS FOR THE PRODUCTION THEREOF

[75] Inventors: Wolfhard Rutz, Hanover; Wolfgang Giersemehl, Haemelerwald; Wolfgang Bauersachs, Wedemark; Karl-Heinz Weissmann, Hanover; Lothar Titze, Uetze, all of Germany

[73] Assignee: Pritt Produktionsgesellschaft mbH, Hanover, Germany

[21] Appl. No.: 913,399

[22] PCT Filed: Feb. 23, 1996

[86] PCT No.: PCT/EP96/00757

§ 371 Date: Nov. 17, 1997

§ 102(e) Date: Nov. 17, 1997

[87] PCT Pub. No.: WO94/28308

PCT Pub. Date: Sep. 19, 1996

[30] Foreign Application Priority Data

Mar. 14, 1995 [DE] Germany ........................ 195 09 124.8

[51] Int. Cl.[6] ........................ B32B 5/16

[52] U.S. Cl. ........................ 428/304.4; 428/315.9; 428/317.1; 428/317.3; 428/317.5; 428/317.7; 428/318.4; 428/327; 427/207.1; 427/208; 427/226

[58] Field of Search ........................ 428/304.4, 315.9, 428/317.1, 317.3, 317.5, 317.7, 318.4, 327; 427/207.1, 208, 226

[56] References Cited

U.S. PATENT DOCUMENTS

| | | | |
|---|---|---|---|
| 3,413,168 | 11/1968 | Danielson et al. | 156/71 |
| 3,869,393 | 3/1975 | Booker | 508/167 |
| 4,427,836 | 1/1984 | Kowalski et al. | 525/301 |
| 4,654,256 | 3/1987 | Doree et al. | 428/304.4 |
| 4,746,558 | 5/1988 | Shimozawa et al. | 428/141 |
| 4,891,260 | 1/1990 | Kunkel et al. | 428/220 |
| 5,135,798 | 8/1992 | Muschter et al. | 428/202 |
| 5,344,705 | 9/1994 | Olsen | 428/323 |

FOREIGN PATENT DOCUMENTS

| | | |
|---|---|---|
| 0 022 633 | 1/1981 | European Pat. Off. . |
| 0 318 804 | 6/1989 | European Pat. Off. . |
| 0 341 715 | 11/1989 | European Pat. Off. . |
| 0 401 509 | 12/1990 | European Pat. Off. . |
| 0 410 248 | 1/1991 | European Pat. Off. . |
| 58-142944 | 8/1983 | Japan . |

OTHER PUBLICATIONS

Farbe & Lack, vol. 93(10):808 (1987).

K.L. Wolf, "Physik und Chemie der Grenzflächen", Springer Verlag, p. 164 (1957).

*Primary Examiner*—Hoa T. Le

*Attorney, Agent, or Firm*—Wayne C. Jaeschke; Martin G. Meder; Glenn E. J. Murphy

[57] ABSTRACT

Described is a multi-layer, flexible transfer tape with a backing and an adhesive layer, wherein between the backing and adhesive layer a bonding agent-containing transfer layer is provided, which adheres more strongly to the adhesive layer than to the backing. With this a) the bonding agent-containing transfer layer and/or b) the adhesive layer contains fine hollow particles and a water-soluble, solid alcohol. Furthermore the invention relates to a suitable process for producing such a transfer tape as well as to special application possibilities of same, in particular in rolled-up form in a hand apparatus. In particular, when used it leads to a transferred layer in which fractures, in particular microcracks, are excluded, and in an improvement of the initial adhesion when the transfer tape is used again after it has been stored for a long time.

22 Claims, No Drawings

MULTI-LAYER, FLEXIBLE TRANSFER TAPE COMPRISING POLYMERIC HOLLOW PARTICLES A PROCESS FOR THE PRODUCTION THEREOF

The invention relates to a multi-layer, flexible transfer tape with a backing and an adhesive layer, wherein between the backing and adhesive layer a bonding agent-containing transfer layer is provided, which adheres more strongly to the adhesive layer than to the backing, to a process for the production thereof as well as the use of this transfer tape in rolled-up form in a hand apparatus.

BACKGROUND OF THE INVENTION

The transfer tape described above is indicated in the EP 0 318 804. Its special feature is that the bonding agent containing transfer layer contains 0.5 to 5% by weight of a soluble cellulose derivative as tear-off agent. The bonding agent containing transfer layer of this tape can be applied neatly and with sharp edges to places or areas (also large areas) that have to be covered. It can be used in rolled-up form in a hand apparatus for a simple, quick and uniform application onto the substrate in question, a stringiness of the adhesive layer during the tearing off being largely excluded. With this transfer tape it was found that, if pigments are contained in the transfer layer, during the application onto a substrate by means of a hand apparatus, micro-cracks may occur in the transferred layer which, when writing on the transferred layer, e.g. with ink or a koki-pen, may result in smudged lettering. Occasionally, when the transfer tape is stored for a long time, the adhesive layer becomes more or less "dried out" and displays a loss of tackiness . This causes poor initial adhesion when the transfer tape is used again.

The U.S. Pat. No. 3,413,168 discloses a self-adhesive cover tape, the adhesive layer of which contains in statistic distribution hollow microspheres with a diameter of 40 to 100 μm protruding therefrom. The microspheres permit an accurate positioning of the tape and break when the tape is pressed down. As a result the tape is glued to the substrate. The JP 5814 2944 A describes a solid cover material which contains 20 to 55% hollow micro-capsules that are filled with solvents, resin solutions or liquid resins.

DETAILED DESCRIPTION OF THE INVENTION

It was, therefore, the object of the invention to improve the known flexible transfer tape in such a way that the described problems are addressed and the use characteristics improved.

According to the invention this object is achieved in that a) the bonding agent-containing transfer layer and/or b) the adhesive layer contains fine hollow particles and a water-soluble, solid alcohol.

This means, in other words, that embodiment a) and embodiment b) can in each instance be realised by themselves. However, also a combination of the two embodiments is possible and offers advantages, as will be noted from the following.

For the advantageous production of the transfer tape according to the invention a process is suitable, in particular, with which a pigment-containing plastic dispersion is applied by the usual application technologies onto a flexible backing, the dispersion agent is evaporated, subsequent to which an adhesive containing aqueous dispersion is applied by the usual application technologies onto the formed transfer layer followed by an evaporating of the water, wherein a) the pigment-containing plastic dispersion contains a water-soluble, solid alcohol and fine hollow particles and/or b) the adhesive-containing aqueous dispersion contains a water-soluble solid alcohol and fine hollow particles.

According to the present invention, a water-soluble, solid alcohol must be present in at least one of the two layers according to embodiments a) and b). It must be a solid alcohol which is soluble in water at room temperature. This group of alcohols comprises, in particular, the 4-valent alcohols, such as erythritol, the 5-valent alcohols, such as arabitol, adonitol and xylitol, the 6-valent alcohols such as sorbitol, mannitol and dulcitol, but also alcohols with one or more other functional groups which do not pose problems within the framework of the invention, such as, in particular, glucose and fructose, but also di-sacchanides, such as saccharose. Sorbitol has proved particularly suitable because of its good hygroscopic properties. Preferably, the bonding agent-containing transfer layer contains about 3 to 25% by weight of water-soluble, solid alcohol, in particular about 5 to 10% by weight. The preferred content of water-soluble, solid alcohol in the adhesive layer is about 1 to 40% by weight, in particular about 5 to 30% by weight.

At least one of the two layers according to the variants a) and b) of the transfer tape according to the invention contains fine, in particular flexible, hollow particles together with the already mentioned water-soluble, solid alcohol. This does not exclude that the other layer contains only fine hollow particles or only a water-soluble, solid alcohol.

The fine hollow particles preferably are spherical. The diameter of the hollow particles, if provided in the adhesive layer b), preferably lies between about 0.25 to 5 μm, in particular between about 0.3 and 2 μm. If present in the bonding agent-containing transfer layer, the hollow particles preferably have a diameter of about 0.3 to 10 μm, in particular between about 0.3 to 5 μm. In total it is preferred that the void volume of the hollow particles amounts to about 20 to 55%, in particular about 25 to 40%. To obtain with the transfer tape according to the invention the advantages which will be indicated further on, it is particularly preferred when the fine hollow particles are flexible, water-containing hollow particles with a porous wall.

The fine hollow particles usually consist of an opaque polymer. However, it is also possible to color this opaque polymer, which coloring should take place during the production by colorants which are compatible with the colorant of the transfer layer.

Particularly advantageous hollow spheres are those with a ratio of wall thickness: diameter of less than 0.25, in particular 0.15 or less. In Farbe+Lack, volume 93, October 1997, the use of this type of hollow spheres made of opaque polymers in paints is described. In the dried paint these spheres are air-filled to increase its covering capacity. The advantageous use of these hollow spheres in intermediate layers of thermosensitive papers in described in the EP 0 341 715 B1. There they contribute to the thermal insulation and elasticity. There exists no relevant technological relation with the present invention. Nevertheless, the hollow spheres described in the indicated publications can be used without restriction and advantageously within the framework of the present invention. Their walls exist, in particular, of styrene resins, acrylic resins or styrene-acrylic copolymer resins. Their production is described, for example, in the U.S. Pat. No. 4,427,836 as well as EP 0 022 633 B1 (patent-holder in both cases Rohm and Haas Company, USA). They are produced by a special emulsion polymerization process, no further details of which will be given here as it does not form the core of the invention. Produced by this known process, the described hollow particles or hollow spheres on completion of the process contain water that at higher temperatures can escape or evaporate through micropores formed in the wall of the hollow particles. Commercially available products that are particularly suitable within the framework of the invention are marketed under the trade name Ropaque, in particular Ropaque OP-62 (particle diameter approximately 0.4 μm, wall thickness approximately 0.06 μm), Ropaque HP-91 (particle diameter approximately 1 μm, wall thickness approximately 0.1 μm) (both marketed by Rohm and Haas Company), as well as Voncoat, in particular Voncoat PP-1100 (particle diameter approximately 0.55 to 0.5 μm, wall thickness approximately 0.11 to 0.12 μm) (marketed by Dainippon Inc., Co., Japan).

The backing of the transfer tape according to the invention preferably consists of plastic foil, as normally used as backing for typewriter ribbons, e.g. of polyethylene terephthalate, polypropylene, polyethylene, polyvinyl chloride or polycarbonate. Also silicone-coated paper has proved suitable as a backing. The silicone-coating reduces the adhesion between the bonding agent-containing transfer layer and the backing. It can be replaced by other anti-adhesion agents, e.g. polytetrafluoroethylene.

The backing preferably has a thickness of about 10 to 60 μm, in particular about 15 to 55 μm, the transfer layer a thickness of about 5 to 40 μm, in particular about 15 to 25 μm, and the adhesive layer a thickness of about 1 to 8 μm, in particular about 2 to 5 μm. To optimize the transfer tape according to the invention a thickness ratio of adhesive layer to transfer layer of about 1:4 to 1:12, in particular 1:8 to 1:10, is chosen.

The adhesive layer may consist of commercially available adhesives. These are elastic and permanently adhesive self-adhesion compounds with high adhesion forces which already under a slight pressure at room temperature adhere immediately to the various surfaces. They are preferably applied in aqueous dispersion onto the transfer layer which is already present on the backing, as in this way the already formed bonding agent-containing transfer layer will not again be dissolved. Among the adhesives of this type especially the acrylate-based ones are advantageous. The starting materials may be viscous solutions or dispersions based on rubber, polyacrylates, polyvinyl ethers and polyvinylisobutylene, respectively. Preferred are commercially available polyacrylate based materials. Suitable commercial products are Ucecryl 913 and Ucecryl PC 80 (marketed by the firm ucb, Dogenbos, Belgium) as well as the plastic dispersion VP 859/6 (marketed by the firm Freihoff). Preferably the to be applied adhesive, which initially is present in an aqueous medium, contains wetting agents or tensides (marketed under the trade name Byk W). The dispersions of the adhesive for forming the adhesive layer are preferably applied to the transfer layer in a quantity of about 1 to 5 g/m$^2$, and particularly preferred in a quantity of about 2 to 4 g/m$^2$.

To form the bonding agent-containing transfer layer, preferably thermoplastic or thermoelastic polymers in aqueous solution or in the form of an aqueous dispersion are used. Within the framework of the invention, to achieve the set object the following substances are advantageously used:

a) polyurethanes with a molecular weight of 15.000 to 50.000, e.g. Permuthane U 4924 of the firm Stahl-Chemie or Desmolac 2100 of the firm Bayer AG,
b) linearly saturated polyesters with a molecular weight of 20.000 to 30.000, e.g. Vitel PE 307 of the firm Goodyear Tire+Rubber, Polyflex 46962 of the firm Morton,
c) styrene-isoprene-styrene copolymers, e.g. Clariflex TR 1107 of the firm Shell-Chemie,
d) acrylates and methacrylates, e.g. Plexigum 7 H of Roehm GmbH,
e) polyamides, diphenylic acid-modified, e.g. Scope 30 of the firm Rhone- Poulenc or Emerez 1533 of the firm Emery Chemicals,
f) polymer dispersions on a vinyl propionate base, e.g. Propiofan 6D of the firm BASF and
g) carboxymethyl groups-containing polymethacrylate soluble in water, e.g. Rohagit SD 15 of the firm Roehm GmbH.

This list is not claimed to be complete and does not signify a limitation in its selection. On the contrary, for the expert it can readily be noted that also other bonding agents can be used, the more so as the essence of the invention does not lie in the type of bonding agent.

To optimize the invention further, when selecting the bonding agent for the formation of the transfer layer, also the type of dasticizer used must be taken into account. During the application of the transfer layer onto the to be corrected or covered area, this should not penetrate through the normally thin adhesive layer and come in contact with the to be corrected area or the colorants present there to in this way produce an undesirable coloring-in of the transfer layer. For the present purpose current plasticisers, such as silicone, castor and mineral oils are suitable. Plasticisers preferred in other fields of application, e.g. phthalic acid esters or olefin alcohol, are not as suitable. To counteract the mentioned disadvantageous effect of plasticizers in borderline cases, a so-called "varnishing agent" can be incorporated in the bonding agent-containing transfer layer which precipitates any migrating colorant or makes it insoluble, so that it cannot migrate into the applied transfer layer and colour same. Suitable varnishing agents are tannin and tannin derivatives. In general, varnishing agents can be used which are contained in inks and koki-pens. They should preferably be present in the bonding agent-containing transfer layer in a quantity of about 0.5 to 5% by weight, in particular about 1.5 to 3.5% by weight, the range between about 2 to 2.5% by weight being particularly preferred. It has been found that the quantity of plasticiser is considerably reduced by the incorporation of water- containing porous hollow particles or in individual cases can even be dispensed with.

During the production of the transfer tape according to the invention, the selected bonding agent for the formation of the transfer layer is converted into an aqueous solution or dispersion. In addition, the additives mentioned in the following are added, when desired. The choice of solvent or dispersing agent depends on the type of bonding agent used, but also on the material of which the hollow particles, in particular fine, flexible, hollow particles consist. The solvent may neither dissolve the wall of the hollow particles nor may it cause the water contained in the hollow particles to be replaced by it to a considerable extent. Preferably, therefore, water is used as solvent or dispersing agent. In principle also all other solvents can be used, provided that they meet the requirements mentioned in the foregoing. These include, in particular, low to medium-boiling organic solvents from the group of alcohols, such as ethanol, isopropanol and butanol, ketones, such as acetone and methylethyl ketone, esters, such as methyl and ethyl acetate, aromatic hydrocarbons such as toluene, aliphatic hydro- carbons such as benzene in the boiling range from 70° to 140° C., by themselves or mixed, butor mixed, but in particular water, by itself or mixed with low-boiling, water-soluble organic solvents.

The concentration of the bonding agent in the solution or dispersion is not essential to the invention. As a rough guide-line it lies between about 3 and 15% by weight, wherein the range of about 6 to 12% by weight is preferred. The solution or dispersion for the formation of the transfer layer is preferably applied onto the backing in a quantity of about 15 to 25 g/$m^2$ and particularly preferred between about 18 and 22 g/$m^2$.

The bonding agent-containing transfer layer may contain colorants. In this connection the term "colorants" must be understood in its widest sense. It is a collective term for all substances that give colour, so that it comprises dyes and pigments, the latter also with a filler character. To be understood here under dyes are those colorants that are soluble in water, organic solvents or bonding agents and which are the opposite of insoluble pigments. The coloration may be present directly or may also only make its appearance by fluorescence. The latter applies, for example, for fluorescent day-light colors. When the transfer tape according to the invention is used to correct writing and illustrations and the like, the bonding agent-containing transfer layer contains, in particular, white pigments, such as titanium white, precipitated chalk, alumina or colloidal silicic acid. If the transfer layer must be coloured, inorganic pigments such as ochre, iron oxide red, iron oxide black, cobalt blue, ultramarine, Berlin blue, or organic pigments such as alkali blue, Hansa yellow (azopigment yellow), phthalocyanine, azo dyes, anthraquinone and metal complex pigments and carbon black can be used. Examples of fluorescent dyes are: Blaze Orange T 15 of the firm Dayglo Maxilonbrillantflavin 10 GFF of the firm Ciba Geigy, Pyranin of the firm Bayer AG and Basonyl-red 540 of the firm BASF.

The control of the optimum covering function of the transfer tape according to the invention, in particular of the bonding agent-containing transfer layer, can take place by means of the pigment. The optimum pigment content depends on various factors, e.g. the type of chosen bonding agent, pigment and other incorporated additives. A particularly critical value or critical range cannot be indicated. As a rough guide-line for the ratio bonding agent/pigment a weight ratio of about 1:1 to 1:12, in particular about 1:3 to 1:8 and especially preferred between about 1:4 to 1:7 can be indicated.

An advantageous constituent of the bonding agent-containing transfer layer of the transfer tape according to the invention is a "tearing-off agent". When applying the transfer layer to a substrate under tensile stress conditions this results in a clean tearing off. As tearing-off agents soluble cellulose derivatives can be used. Particularly preferred cellulose derivatives are the cellulose ethers soluble in organic solvents and/or water, e.g. methyl, ethyl, hydroxyethyl, ethyl-hydroxyethyl and carboxymethyl celluloses, cellulose esters such as cellulose acetobutyrate and propionate. Also many other soluble cellulose derivatives which give the desired effects are suitable. Apparently the basic cellulose structure in the soluble cellulose derivative is important, whereas the imported groups, such as the ethyl group etc., ensure that the formed derivative is soluble in the chosen solvent.

The quantity of the tearing-off agent incorporated in the transfer tape amounts to about 0.5 to 5 by weight, in particular about 1.5 to 3.5% by weight. The range of about 2 to 2.5% by weight is particularly preferred. These data refer to the dry substance. For an optimal formation of the transfer layer also the quantity ratio of tearing-off agent to bonding agent can be taken as a basis. A rough guide-line that applies here is that the ratio of tearing-off agent to bonding agent is about 1:2 to 1:20, the range of about 1:4 to 1:10 being preferred.

To control the application process, but also the properties of the transfer layer applied to a substrate, other additives can be incorporated in same. These may be agents to improve the covering capacity, such as in particular aluminium silicate, toning agents, e.g. carbon black, or the already mentioned varnishing agents, in particular for basic dyes in the form of, for example, gallic acid derivatives, e.g. Printan of the firm Ciba Geigy.

The abovementioned materials of the individual layers of the transfer tape according to the invention as a rule comply with the basic requirement that the adhesion (defined by way of the adhesion work as per the Dupre equation, Lit.: K. L. Wolf "Physics and chemistry of interfaces", Springer Verlag 1957, p. 164) between the adhesive layer and transfer layer is greater than that between the backing and transfer layer. If this does not apply in an individual case, a suitable anti-adhesion layer would have to be applied on the backing to meet this basic requirement. In such cases, as a rule a further requirement applies, according to which the transfer layer formed on the substrate must be non-adhesive with respect to other materials that come in contact with it. As a result the following adhesion ratios can be indicated for a successful use of the transfer tape according to the invention, wherein the symbol "S" indicates the adhesion ratio between the various materials: $S_1$ paper/adhesive layer, $S_2$ transfer layer/adhesive layer, $S_3$ transfer layer/backing, $S_4$ transfer layer/paper and $S_5$, adhesive layer/backing. If at all possible, the following ratios should be adhered to: $S_1$ greater than $S_3$, $S_2$ greater than $S_3$, $S_5$ very much smaller than $S_2$ and $S_5$ smaller than $S_3$. Furthermore, the free surface of the transfer layer applied to a substrate, in particular paper, should, if at all possible, not display any adhesion to the outside, i.e. $S_4$ then is zero or nearly zero. The applied transfer layer should, therefore, be non-adhesive when touched by hand or paper.

To achieve the desired effects, also preferred quantitative framework conditions are adhered to for the hollow particles in the two layers a) and b). In this connection it is preferred when about 1 to 25% by weight of hollow particles, in particular about 5 to 20% by weight, are present in the bonding agent-containing transfer layer as well as about 1 to 25% by weight, in particular about 5 to 20% by weight, of hollow particles in the adhesive layer. This percentage does not take into account any possible water content.

The present invention, with respect to the aforementioned characteristics and the effects associated therewith, can technologically be explained as follows:

When the indicated hollow particles, in particular the water-containing porous hollow spheres, are incorporated in the adhesive layer, this ensures that when the transfer tape is used again, the adhesion of the adhesive layer which is reduced by a "drying out" is increased again by the also incorporated solid, water soluble alcohol due to the fact that as a result of the pressing down a small but adequate quantity of water escapes through the microporous wall of the hollow spheres and produces a moistening of the solid alcohol, so that a loss of tackiness that might otherwise occur is eliminated. To achieve this advantage, the production of the transfer tape according to the invention preferably takes place in such a way that as fine hollow particles flexible, water-containing hollow particles with a porous wall are used, and the dispersing agent of the plastic dispersion and the water of the aqueous dispersion are evaporated under such gentle conditions that the water present inside the hollow particles for the greater part remains there. The aim here should not be that all the water remains in the hollow spheres, but it must be ensured that on completion of the production process at least an adequate quantity of water has remained behind in the hollow spheres. The solid alcohol which is present ensures that the water escaping through the micro-porous wall, because of the hygroscopic behavior of the alcohol, is to a certain extent held back. This "water reservoir" inside the adhesive layer is retained in particular when the adhesive tape according to the invention is used rolled-up in a hand-operated adhesive tape roller. Further details in this respect will still be furnished further on.

The abovementioned mechanism when using the transfer tape according to the invention with respect to the solid alcohol/porous hollow particles also applies in a corresponding manner to the way in which the transfer layer of the transfer tape according to the invention functions. Also here, as a result of the application pressure water is pressed through the microporous wall of the hollow particles with the result that the solid alcohol is at least solubilized or in individual cases dissolved. Here the solid alcohol under these conditions brings about a temporary softening of the bonding agent-containing transfer layer so that during the application this layer becomes more flexible and no micro-cracks occur. By releasing the application pressure the water pressed out of the hollow particles volatilizes to a certain extent notwithstanding the hygroscopic behavior of the solid alcohol, so that the latter again becomes solid and the temporary softening is eliminated.

It would appear that further advantages can be attributed to the use of, in particular, porous hollow particles in the transfer layer. Thus, it has been found that as the quantity of hollow particles increases, "bleedthrough" of a corrected writing will be forced back, probably due to the hydrophobic nature of the wall of the hollow particles. This desirable effect is obtained, in particular, within the indicated optimum weight-percentage range of the hollow particles. In addition, the quantity of hollow particles increases the covering capacity with the result that the quantity of, for example, expensive white pigment in the form of titanium dioxide can be reduced. The very small and extraordinary regular particle size of the indicated hollow particles prevents the sticking together of the pigment particles, in particular titanium dioxide particles, so that no non-homogeneities occur in the transfer layer which during the use of the transfer tape often are the cause of the occurrence of micro-cracks. As a result the covering layer displays an improved elasticity which also counteracts the occurrence of micro-cracks.

When using the transfer tape according to the invention it is advantageous to use application apparatuses which permit a rolling off of the transfer layer provided with the adhesive whilst at the same time pulling off the backing. This ensures a particularly simple use of the transfer tape according to the invention. They may be commercially available hand apparatuses. A particularly suitable hand apparatus is a so-called "hand roller", with which inside an easy-to-grip housing a supply reel of transfer tape is provided, from where it is guided over an application foot protruding from the housing and from there it is again passed back to a take-up reel inside the housing. A suitable gear unit between the two reels of the housing ensures that the transfer tape is always under adequate tension. To use the transfer tape, the user takes the housing in his hand and by means of the application foot presses the outer (detachable) tape layer running over the edge of same against the substrate onto which it must be applied (e.g. a printed sheet of paper to make corrections). During the pressing on the user moves the apparatus relative to the substrate and in doing so transfers, for example, a covering layer or fluorescent layer onto the substrate, during which the flexible backing is wound off the supply reel and onto the take-up reel.

It will readily be realised that the mode of operation of the hand apparatus described above makes it essential that the already indicated adhesion conditions are adhered to, i.e. that the adhesion between the adhesive layer and the backing must be smaller than the adhesion between the bonding agent-containing transfer layer and the adhesive layer and smaller than the adhesion between the bonding agent- containing transfer layer and the backing.

The transfer tape according to the invention is particularly suitable as a correction means in the office, school and household to cover incorrect writing, marks and illustrations and to put on new writing. Another use of the transfer tape can be the conspicuous coloured marking of areas, lettering and/or symbols. For this purpose the transfer tape has a transfer layer that contains a coloured pigment. Another use consists of emphasising texts, symbols or illustrations. For this purpose the transfer layer is preferably transparent and coloured with a dye which fluoresces in day-light. In all application examples mentioned here it has proved particularly advantageous that the use takes place "dry", i.e. no smudging of liquid coatings and no evaporation of hazardous solvents takes place and an immediate re-writing is possible. With the transfer tape according to the invention, for example, cover layers that in particular contain colourants, can therefore be applied onto substrates easily, quickly and uniformly. When the transfer layer of the transfer tape is transparent, i.e. does not contain covering pigments, it can be used for just a covering without colour effect and for the preservation of texts that otherwise would be sensitive to the effects of air and the like.

The use characteristics of the transfer tape according to the invention have, in particular, been extensively improved. Thus, the adhesive layer, after having been stored for a long time, when it is largely dried out, is at least slightly moistened and in this way the adhesion is improved when it contains the described hollow particles. When incorporating them together with a solid alcohol in the transfer layer, the cohesion of the latter is reduced and the tear-off behavior improved. This takes place by a temporary softening. The incorporation of a large quantity of customary plasticisers is disadvantageous, as already mentioned in the foregoing, as these would make the covering layer permanently soft. This would, among others, result in an undesirable bleeding out of the covered writing or even a bleeding through. When writing on such a transfer layer with ink, the ink would smudge. In addition, the use of the fine, flexible, water-containing particles ensures that, when using expensive pigments, e.g. especially titanium dioxide, the quantity of pigment can be reduced.

EXAMPLES

In the following the invention will be explained in greater detail with reference to examples.

EXAMPLE 1

(embodiment of the transfer layer)

The following aqueous dispersion was prepared to form the colorant-containing transfer layer.

| | |
|---|---|
| Aqueous acrylate dispersion (25% in water/commercial product Worleecryl ® 7712W of the firm Worlee Chemie GmbH, Hamburg) | 23.42 parts by weight |
| Lactimon ® WS (Alkyl ammonium salts of polycarbonic acids and polysiloxane copolymer) | 0.8 parts by weight |
| 2-butoxyethanol | 1.5 parts by weight |
| Byk ® 034 (hydrophobic, silicone-like components in mineral oil) Byk ® 307 | 0.2 parts by weight |
| (Polyether modified dimethyl polysiloxane copolymer) | 0.02 parts by weight |
| Sorbitol | 5.00 parts by weight |
| Silicic acid | 4.00 parts by weight |
| Titanium dioxide | 35.00 parts by weight |
| Ivory black | 0.06 parts by weight |
| Aqueous dispersion of fine hollow spheres | 30.00 parts by weight |
| | 100.00 parts by weight |

The abovementioned aqueous hollow sphere dispersion is prepared as follows 800 parts by weight of the commercially available Ropaquee® emulsion Op-62 LO-E of the firm Rohm & Haas Company, Philadelphia, USA (consisting of a non-film forming polymer with an effective solids content of 52% as well as an actual solids content of 37.5% and a pH-value of 8.0 to 8.7 (particle diameter 0.4 $\mu$m, inside diameter 0.28 $\mu$m)) are mixed with 176 parts by weight of water and 2 parts by weight of an anti-foaming additive (Byk®-034) (hydrophobic, silicone-containing components in mineral oil) and 22 parts by weight of a formic acid solution (produced by mixing 100 parts by weight of concentrated formic acid and 900 parts by weight of water). Of this acidified dispersion 30 parts by weight are used in the above formulation.

The abovementioned covering compound is applied with a ductor blade in a quantity of 18 g/m$^2$ onto a siliconised paper backing. Then the water is evaporated at about 80° C. by passing hot air over.

Next an aqueous dispersion, which consists of the following constituents, is applied with a doctor blade onto the surface of the colorant-containing cover layer.

| | |
|---|---|
| Acrylate based adhesive (plastic dispersion VP 859/6 of the firm Freihoff) (copolymer based on acrylic acid esters) | 57.3 parts by weight |
| Water | 41.1 parts by weight |
| Ammonia | 1.6 parts by weight |
| | 100.0 parts by weight |

The adhesive compound is applied with a ductor blade in a thickness of 3 g/m$^2$. Then the water content of the adhesive compound is evaporated at about 80° C. by passing air over it. The water inside the hollow spheres in the transfer layer remains inside same.

The obtained transfer tape is particularly suitable for covering text written on paper. It ensures a quick and uniform application of a cover strip on which one can immediately write again, the applying taking place with the aid of a commercially available hand roller. Newly applied writing is clear and when observed under the microscope does not show any smudging at the edges.

EXAMPLE 2

(embodiment of the transfer layer)

The following aqueous dispersion is prepared for forming the colorant-containing transfer layer.

| | |
|---|---|
| Aqueous acrylate dispersion (15% in water/commercial product Worleecry ® 7712W of the firm Worlee Chemie GmbH, Hamburg) | 20.42 parts by weight |
| Lactimon ® WS (Alkyl ammonium salts of polycarbonic acids and polysiloxane copolymer) | 0.8 parts by weight |
| 2-butoxyethanol | 1.5 parts by weight |
| Byk ® 034 (hydrophobic, silicone-like components in mineral oil) Byk ® 307 | 0.2 parts by weight |
| (Polyether modified dimethyl polysiloxane copolymer) | 0.02 parts by weight |
| Sorbitol | 8.00 parts by weight |
| Silicic acid | 4.00 parts by weight |
| Titanium dioxide | 35.00 parts by weight |
| Ivory black | 0.06 parts by weight |
| Aqueous dispersion of fine hollow spheres | 30.00 parts by weight |
| | 100.00 parts by weight |

This dispersion was used in the same way as described in example 1. The same also applies to the formation of the adhesive layer.

EXAMPLE 3

(embodiment of the adhesive layer)

The following aqueous dispersion was prepared for forming the colorant-containing transfer layer.

Adhesive layer formulation - example 1

| | |
|---|---|
| Water | 16.1 parts by weight |
| Acrylate based adhesive (50%) (plastic dispersion VP 859/6 of the firm Freihoff) | 57.3 parts by weight |
| Ammonia | 1.6 parts by weight |
| Sorbitol | 10.0 parts by weight |
| Ropaque ® OP-62 LO-E (37,5%) | 15.0 parts by weight |
| | 100.0 parts by weight |

The formation of the adhesive layer took place as in example 1.

EXAMPLE 4

(embodiment of the adhesive layer

The following aqueous dispersion was prepared for the formation of the colorant-containing transfer layer:

Adhesive formulation - example 2

| | |
|---|---|
| Water | 21.1 parts by weight |
| Acrylate based adhesive (50%) (plastic dispersion VP 859/6 of the firm Freihoff) | 57.3 parts by weight |
| Ammonia | 1.6 parts by weight |
| Sorbitol | 5.0 parts by weight |
| Ropaque ® OP-62 LO-E (37,5%) | 15.0 parts by weight |
| | 100.0 parts by weight |

The formation of the adhesive layer took place as in example 1.

What is claimed is:

1. A multi-layer, flexible transfer tape comprising:

a backing layer;

an adhesive layer; and a bonding agent-comprising transfer layer provided between the backing layer and the adhesive layer, wherein said bonding agent-comprising transfer layer adheres more strongly to the adhesive layer than to the backing layer, and wherein the bonding agent-comprising transfer layer and/or the adhesive layer comprises fine polymeric hollow particles and a water-soluble, solid alcohol.

2. The transfer tape according to claim 1, wherein the fine hollow particles are water-comprising hollow articles with a porous wall.

3. The transfer tape according to claim 1, wherein the hollow particles in the bonding agent-comprising transfer layer have diameter of about 0.3 to about 10 $\mu$m.

4. The transfer tape according to claim 1, wherein the hollow particles in the adhesive layer have a diameter of about 0.3 to about 2 $\mu$m.

5. The transfer tape according to claim 1, wherein the void volume of the hollow particles amounts to about 20 to about 55% of the particles.

6. The transfer tape according to claim 1, wherein the void volume of the hollow particles amounts to about 25 to about 40% of the particles.

7. The transfer tape according to claim 1, wherein the bonding agent-comprising transfer layer comprises about 3 to about 25% by weight of water-soluble, solid alcohol.

8. The transfer tape according to claim 1, wherein the bonding agent-comprising transfer layer comprises about 1 to about 25% by weight of hollow particles.

9. The transfer tape according to claim 1, wherein the adhesive layer comprises about 1 to about 25% by weight of hollow particles.

10. The transfer tape according to claim 1, wherein the adhesive layer comprises about 1 to about 40% by weight of water-soluble, solid alcohol.

11. A process for producing a multi-layer, flexible transfer tape according to claim 1, comprising the steps of:

applying a plastic dispersion comprising a pigment and dispersion agent onto a flexible backing;

evaporating the dispersion agent to form a transfer layer;

applying an adhesive-comprising aqueous dispersion onto the formed transfer layer; and evaporating the water, wherein the pigment-comprising plastic dispersion comprises a water-soluble, solid alcohol and fine hollow particles and/or the adhesive-comprising aqueous dispersion comprises a water-soluble, solid alcohol and fine hollow particles.

12. In a process comprising the step of applying transfer tape in rolled-up form in a hand apparatus to a substrate, wherein the improvement comprises applying the transfer tape according to claim 1, wherein the adhesion between the adhesive layer and the backing is smaller than the adhesion between the bonding agent-comprising transfer layer and the adhesive layer and smaller than the adhesion between the bonding agent-comprising transfer layer and the backing.

13. A multi-layer, flexible transfer tape comprising:

a backing layer;

an adhesive layer, wherein the adhesive layer comprises a water-soluble, solid alcohol; and a bonding agent-comprising transfer layer provided between the backing layer and the adhesive layer, wherein said bonding agent-comprising transfer layer adheres more strongly to the adhesive layer than to the backing layer, and wherein the bonding agent-comprising transfer layer comprises fine polymeric hollow particles and a water-soluble, solid alcohol.

14. The transfer tape according to claim 13, wherein the fine hollow particles are water-comprising hollow articles with a porous wall.

15. The transfer tape according to claim 13, wherein the void volume of the hollow particles amounts to about 20 to about 55% of the particles.

16. The transfer tape according to claim 13, wherein the void volume of the hollow particles amounts to about 25 to about 40% of the particles.

17. The transfer tape according to claim 13, wherein the hollow particles in the bonding agent-comprising transfer layer have diameter of about 0.3 to about 10 $\mu$m.

18. The transfer tape according to claim 13, wherein the bonding agent-comprising transfer layer comprises about 3 to about 25% by weight of water-soluble, solid alcohol.

19. The transfer tape according to claim 13, wherein the bonding agent-comprising transfer layer comprises about 1 to about 25% by weight of hollow particles.

20. The transfer tape according to claim 13, wherein the adhesive layer comprises about 1 to about 40% by weight of water-soluble, solid alcohol.

21. A process for producing a multi-layer, flexible transfer tape according to claim 13, comprising the steps of:

applying a plastic dispersion comprising a pigment and dispersion agent onto a flexible backing;

evaporating the dispersion agent to form a transfer layer;

applying an adhesive-comprising aqueous dispersion onto the formed transfer layer; and evaporating the water, wherein the pigment-comprising plastic dispersion comprises a water-soluble, solid alcohol and fine hollow particles and/or the adhesive-comprising aqueous dispersion comprises a water-soluble, solid alcohol and fine hollow particles.

22. In a process comprising the step of applying transfer tape in rolled-up form in a hand apparatus to a substrate, wherein the improvement comprises applying the transfer tape according to claim 13, wherein the adhesion between the adhesive layer and the backing is smaller than the adhesion between the bonding agent-comprising transfer layer and the adhesive layer and smaller than the adhesion between the bonding agent-comprising transfer layer and the backing.

* * * * *